United States Patent [19]

Baker et al.

[11] 3,861,289
[45] Jan. 21, 1975

[54] TACO SHELL FRYER

[75] Inventors: Edward D. Baker, Belmont; Nils Lang-Ree, San Jose, both of Calif.

[73] Assignee: NPI Corporation, Burlingame, Calif.

[22] Filed: Nov. 8, 1973

[21] Appl. No.: 414,158

[52] U.S. Cl. ............... 99/404, 99/427, 99/443 C, 198/165
[51] Int. Cl. ............................................. A47j 37/12
[58] Field of Search ............... 99/427, 352–353, 99/355, 404, 423, 426, 443; 198/165

[56] References Cited
UNITED STATES PATENTS

| | | | |
|---|---|---|---|
| 2,603,143 | 7/1952 | Saenz | 99/353 |
| 2,861,673 | 11/1958 | Sandganger | 198/165 |
| 3,570,393 | 3/1971 | Schy | 99/427 X |
| 3,602,130 | 8/1971 | Perez | 99/404 |
| 3,722,400 | 3/1973 | Jimenez | 99/427 X |
| 3,785,273 | 1/1974 | Stickle | 99/427 X |

*Primary Examiner*—Peter Feldman
*Assistant Examiner*—Arthur O. Henderson
*Attorney, Agent, or Firm*—Lothrop & West

[57] ABSTRACT

A taco fryer has a frame on which is supported an open top tank for containing heated frying oil. An endless, pan conveyor travels on the frame so as to dip down into and rise out of the oil. A horizontally extending rod on the pan conveyor supports pairs of complementary pan portions mounted to move between a first position with both pan portions occupying the same plane and a second position with both pan portions depending from the frame. During this movement a tortilla supported on the pan portions bends over the rod and is pressed toward the rod and the pan portions. This is done by a belt draped over the rod and pan portions and suspended from a continuous belt conveyor having a portion traveling generally parallel to the pan conveyor. The belt conveyor structure can be raised and lowered for cleaning purposes. The belt conveyor and the pan conveyor converge and diverge in order that tortillas can be loaded onto and taco shells can be unloaded from the pan portions.

8 Claims, 6 Drawing Figures

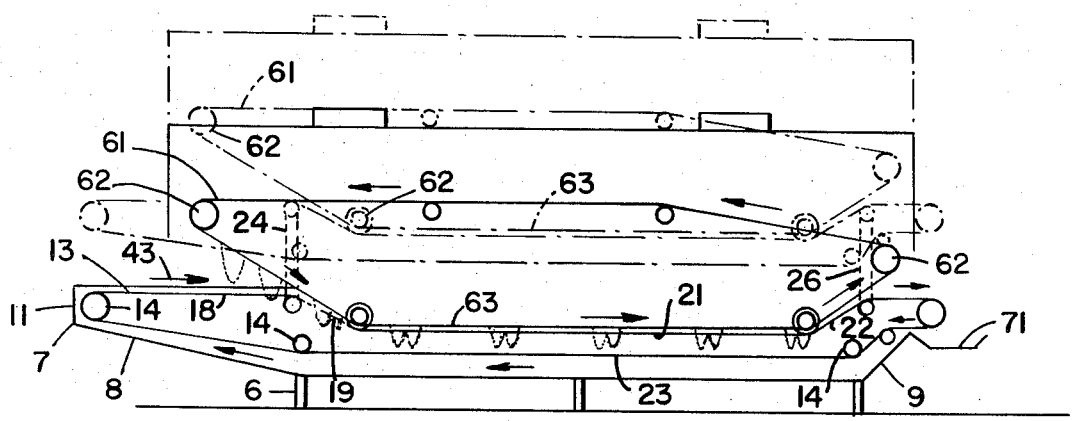
FIG_1
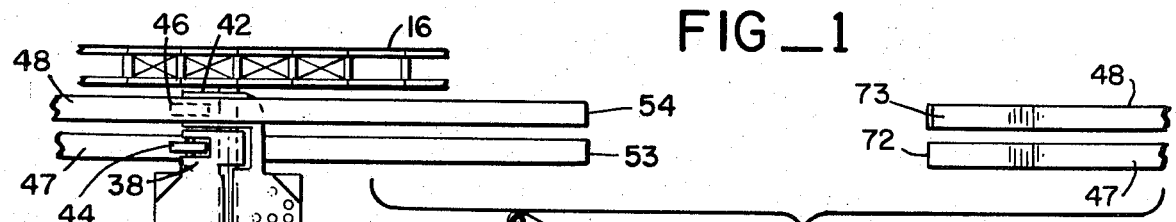
FIG_2
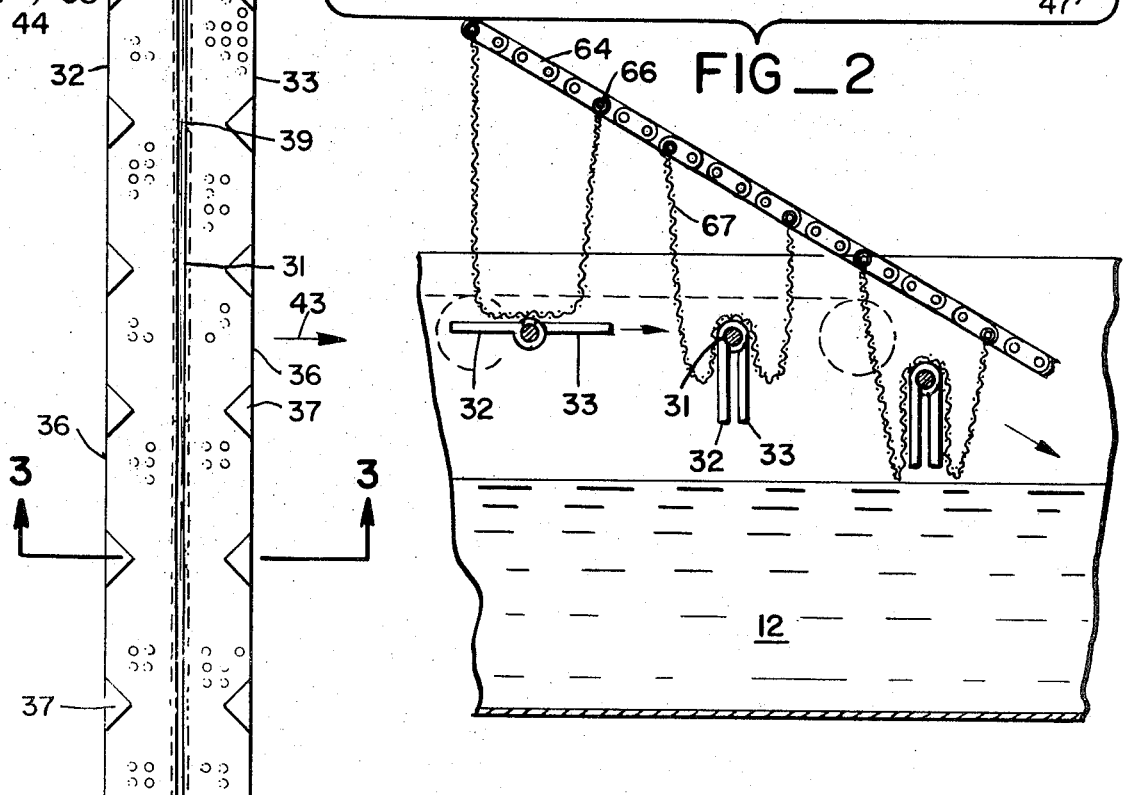
FIG_3

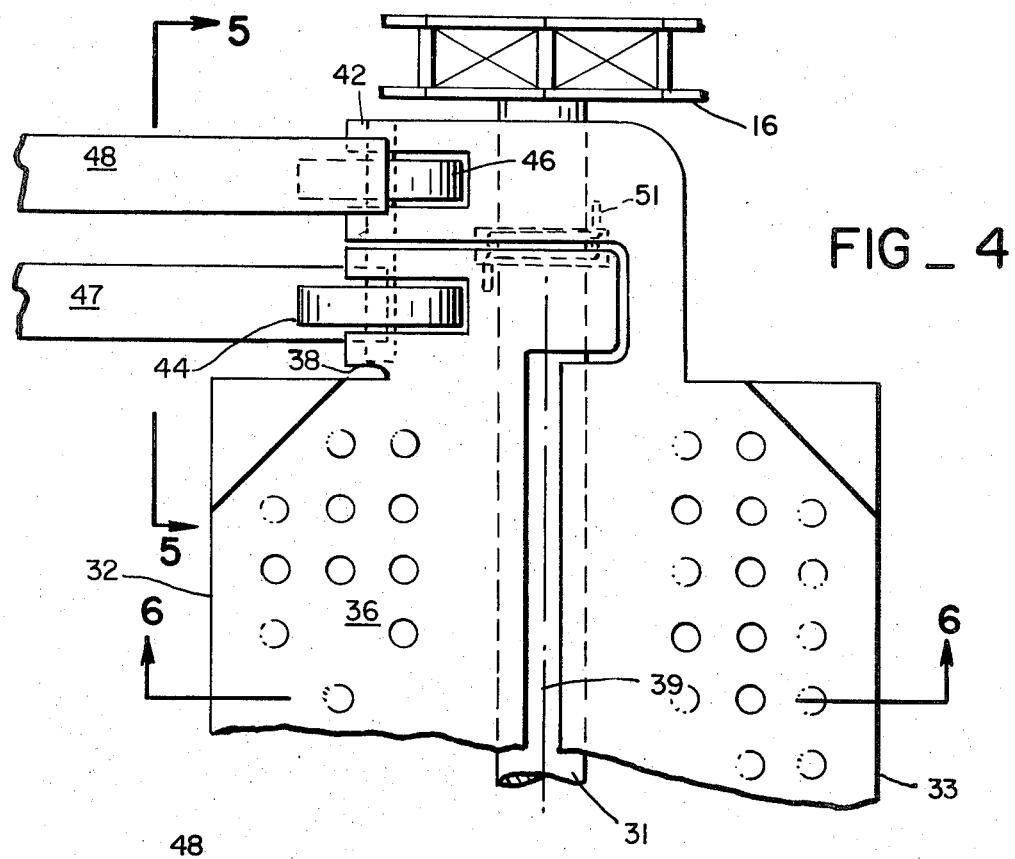
FIG_4
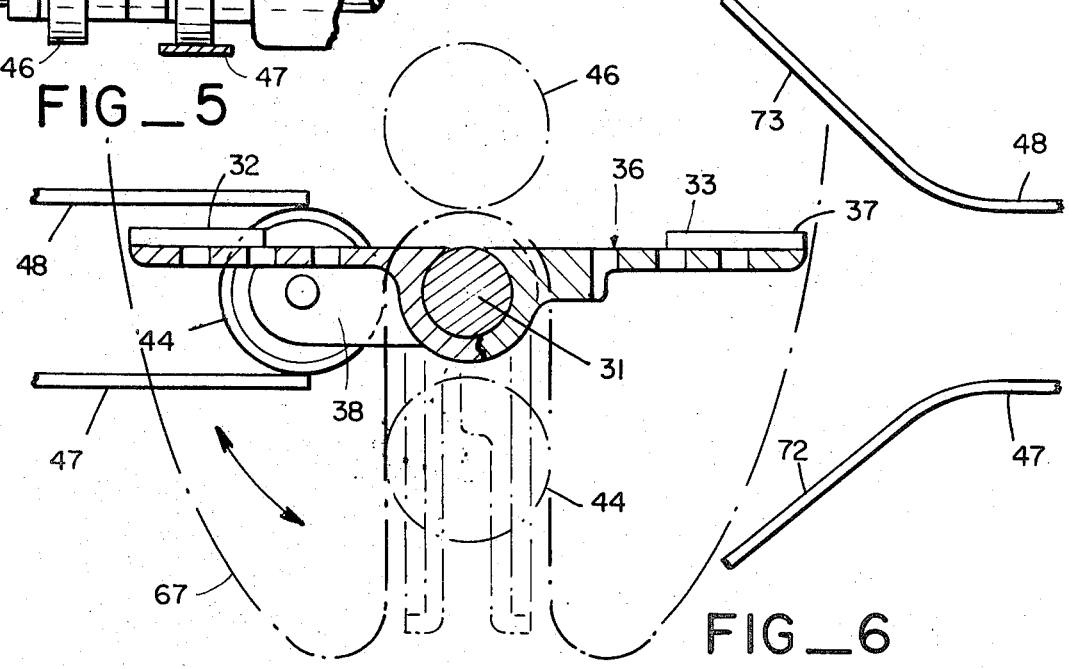
FIG_5
FIG_6

TACO SHELL FRYER

In the furnishing of various foods requiring frying and particularly operations such as the supplying of tacos, it is necessary to provide a means for quickly frying a large number of tortillas in a shape known as a taco shell. The shell results from a flat, limp tortilla being positioned in a substantially U-shaped fold contour and then being stiffened by frying so that it can subsequently receive the taco filling.

It is therefore an object of the invention to provide a machine for automatically frying a relatively large number of tortillas to product taco shells.

Another object of the invention is to provide a taco shell fryer effective to provide taco shells of a uniform and consistent configuration.

Another object of the invention is to provide a taco shell fryer easily loaded with tortillas.

A further object of the invention is to provide a taco shell fryer effective to fry tortillas of different sizes.

A further object of the invention is to provide a taco shell fryer that can be maintained in a sanitary condition.

A further object of the invention is to provide a taco shell fryer in which the tortillas are confined to and maintained in appropriate locations during cooking.

A further object of the invention is to provide a taco shell fryer of generally improved characteristics.

Other objects of the invention, together with the foregoing, are attained in the embodiment of the invention described in the accompanying description and illustrated in the accompanying drawings, in which:

FIG. 1 is a diagrammatic view showin a taco shell fryer pursuant to the invention in longitudinal cross-section on a vertical plane;

FIG. 2 is a fragmentary view showing in plan a portion of the taco fryer including pan sections and some portions of the controlling rails;

FIG. 3 is a cross-section, the plane of which is indicated by the line 3—3 of FIG. 2, portions being broken away to reduce the size of the figure;

FIG. 4 is an enlargement of one end portion of the pan section of the machine similar to the showing in FIG. 2;

FIG. 5 is a fragmentary view showing in cross-section a portion of the pan controlling mechanism, the plane of section being indicated by the line 5—5 of FIG. 4; and FIG. 6 is a cross-section, the plane of which is indicated by the line 6—6 of FIG. 4, portions being broken away to reduce the size of the figure and parts being telescoped to reduce the size of the figure.

In the customary instance the starting material for producing a taco shell is a tortilla. This is a relatively limp, roughly circular cake varying in size but usually approximately six inches in diameter and about 3/32nds of an inch thick. The finished product of taco shell is a tortilla which has been folded along a diameter to define a U-shaped container having parallel walls extending from a rounded fold. A space of about one inch remains between the sides or walls of the taco shell. The curved margins of the folded taco shell are closely in alignment. A taco shell with one of the sides longer than the other is J-shaped rather than U-shaped in end elevation. This is undesirable in most instances because it does not hold as much stuffing or holds the filling as well as a U-shaped, aligned taco shell.

In order to produce the desired product, we provide a taco shell fryer inclusive of a main frame 6 constituted of the customary angles and shapes. This affords an appropriate support for the mechanism and especially for an open top tank 7. The tank extends or cantilevers out from the frame 6 on both ends and has a downwardly inclined entrance portion 8 and an upwardly inclined exit portion 9. The tank has uniformly high walls 11 extending along the sides and across the entrance end but has a somewhat lower wall at the exit end. The tank contains a body 12 of heated cooking oil, as indicated in FIG. 3.

Arranged on the main frame 6 in superposition with respect to the tank 7 in a pan conveyor 13. This is mounted on a sub-frame, not illustrated in detail, effective to carry sprockets 14 in several related pairs adjacent opposite sides of the machine. There is trained around the various sprockets a pair of pan conveyor chains 16 and 17 (FIG. 2). The pan conveyor chains are endless and each has an upper run 18 having an initially flat or horizontal loading portion followed by a downwardly inclined portion 19, a submerged portion 21, an upwardly inclined portion 22 and a flat discharging portion. There is also a lower run 23 serving as a return portion.

Conveniently, the sub-frame for the pan conveyor 13 is supported on jacks 24 and 26, shown diagrammatically in FIG. 1. The pan conveyor 13 can be moved vertically between a lower position partially submerged in the tank and an upper position well above the tank, in order to facilitate the cleaning of the structure from time to time.

In accordance with the invention there are provided on the chains 16 and 17 of the pan conveyor and arranged at appropriately spaced intervals thereon a number of horizontal, transversely extending rods 31. At their opposite ends the rods are set in appropriate links of the chains 16 and 17 so that the rod partake of the advancement of the chains.

Journalled on each of the rods 31 are pairs of complementary pan plates 32 and 33. These plates are very nearly alike so that the description of one applies generally to the other. While but one pair of pan plates can be used, it is preferred to use many pairs set close together. The pan plates 32 are generally flat, having a width equal to, say, six tortillas and a length about half a tortilla. The plates 33 are the same, in reverse symmetry. Both plates 32 and 33 are perforated. Considered together, the complementary pan portions 32 and 33 support tortillas without much obstruction. Each pan plate has the upper plant 36 located to be substantially tangent to the outer surface of the circular rod 31. The plan plates 32 and 33 have locating lugs 37 or spacers upstanding from the plate for approximately the same distance as the thickness of a tortilla. While the pan portions 32 and 33 are arranged exactly opposite each other, there may be some space left between them in which the rod 31 constitutes an intermediate support or pan continuation.

The pan plates are arranged so that they can move between two extreme positions. As shown particularly in FIGS. 2 and 3, the pan plate 32 has at each end a lever arm 38 extending in one direction from the axis 39 of the rod 31. The pan plate 33 at each end has a similar lever arm 42 curved around the arm 38 and extending from the axis 39 in the same direction. This is a trailing direction, the direction of advance of the upper run of the conveyor 13, as shown in FIGS. 1 and 2, being indicated by an arrow 43.

Conveniently, each of the lever arms 38 and 42 is provided with one of a pair of rollers 44 and 46 operating respectively on a track 47 which is one of a pair and on a similar track 48 also one of a pair. Although only partially shown in the drawings, each of the tracks 47 and 48 forms virtually a complete circuit except for a long, intervening gap (see FIG. 2) and is mounted on the sub-frame for the pan conveyor so as to maintain a fixed relationship with the location of the chains 16 and 17. Preferably, the track pairs are provided symmetrically on opposite sides of the machine. The tracks 47 and 48 are offset or staggered transversely, as shown in FIG. 5, and are spaced apart vertically a distance about equal to the diameter of the rollers 44 and 46. While gravity tends to keep the rollers and the tracks in contact, helical springs 51 at their opposite ends engage the respective lever arms 38 and 42 in order to insure a spring load on the rollers to urge them into contact with the respective tracks, as shown in FIG. 4.

With this much of the structure, when the chains 16 and 17 advance on the upper run in the direction of the arrow 43, the rods 31 are correspondingly advanced and the pan plates 32 and 33 are maintained very closely in a horizontal plane. This is because the weight of the pan plate 32 causes the roller 44 to bear down upon the track 47 and so support the pan plate 32 in a horizontal position. Similarly, the weight of the pan plate 33 causes the roller 46 to press upwardly against the track 48 and so maintain the pan plate 33 in the same horizontal plane as the plate 32.

As the pan plates become available at the flat, horizontal entrance part of the machine, tortillas of somewhat varying diameters can be dumped onto the plates in an approximation of a regular order. This may be done by a belt conveyor or oven conveyor, not shown. The tortillas need not be precisely loaded since a single attendant can, if necessary, slide or push them, without lifting or precise handling, into positions defined between the upstanding locating lugs 37. The lugs accommodate tortillas of somewhat irregular shapes and of considerable variation in size without permitting the tortillas to shift sufficiently to produce unwanted J-shaped taco shells. The tortillas lie flat and in proper position. In this machine six tortillas across are so deposited. As the pan conveyor 13 continues to advance the rollers 44 and 46 remain in contact with the tracks 47 and 48. The just loaded tortillas are thus initially advanced in a horizontal position.

At a later stage the pan conveyor advances to a point at which the rollers 44 and 46 virtually simultaneously ride away from the ends 53 and 54 of the tracks 47 and 48. At this point, as particularly shown in FIGS. 3 and 6, there is no longer any support of the lever arms by the tracks. The rollers are then free to travel, partly under the influence of the unbalanced weight of the pan plates and partly under the influence of the springs 51, through about ninety degrees each. In their new positions the pan plates are substantially back to back, having rotated around the axis 39 of the rod 31. This dropping or folding motion of the pan plates permits the superposed tortillas to bend or droop around the rod 31. The diameter of the rod establishes the width or extent of the central fold of each tortilla. The side portions of each tortilla drape from the rod by gravity and lie more or less against the now depending or vertical pan plates 32 and 33. The tortillas are thus folded into proper shape ready to be carried downwardly into the cooking oil body 12.

There is particularly provided a special means for insuring that during the folding motion of the pan plates, each tortilla remains in its initially centered or correct position and is properly folded down. If a tortilla shifts position it may be unevenly folded and the sides unbalanced producing a product that is J-shaped when seen in end elevation. This is considered undesirable. Consequently, tortilla retaining means are provided.

Supported by the jacks 24 and 26 on the main frame 6 is an auxiliary frame (not shown in detail) mounted on the jacks 24 and 26 and carrying a belt conveyor 61 trained around a number of pulleys 62 on the belt conveyor auxiliary frame. The belt conveyor follows a closed path in which the lower run 63 of the belt conveyor coincides almost exactly with the upper run of the pan conveyor but is spaced slightly thereabove. The belt conveyor 61 includes a pair of side chains 64 (FIG. 3) spanning which at convenient intervals are horizontal holding rods 66.

Connected at their opposite ends to the successive rods 66 and suspended in catenary curves therefrom are sections 67 of link fabric or chain belts. These extend for substantially the full width of the belt conveyor 61 and have a sufficient drape length so that the chain belt sections 67 can hang freely in the upper portions of the belt conveyor. The shape of the path of the belt conveyor 61 is such that as the pan plates 32 and 33 advance horizontally in the feeding portion of the machine, the belt sections 67 are spaced well above the plates. Tortillas having been fed into the easily accessible pan plates, the loaded pan plates arrive in a position near the ends 53 and 54 of the tracks 47 and 48. Just before the pan plates are about to fold downwardly, the belt sections 67 on the descending belt conveyor 61 lower as they advance. The descending flexible chain belt sections are timed or synchronized to drape themselves upon and over the tortillas on the pan plates and so overlie the still horizontal tortillas. This imposes the belt weight or a portion of the belt weight upon the tortillas. The belt sections continue to descend, as shown in FIG. 3, until the pan plates have entirely or almost entirely folded. The belt sections fold therewith and continuously hold the limp tortillas in position while they fold. The tortillas do not materially shift. Each is bent into its desired U-shaped, evenly folded condition between the tortilla pan plates and the overlying, adjacent, flexible belt.

The tortillas, having been bent or folded, are in that shape advanced through the cooking coil. They are surrounded, virtually, by the pan plates and the flexible chain belt sections. The perforated pan plates and the chains or fabric allow ready and sufficient access to the tortillas of the cooking oil. As the confined tortillas advance through the oil tank they are cooked and thus stiffened in the shape of taco shells. Near the outlet end 9 the chain belt conveyor 61 rises. The chain belt sections 67 are lifted off of the finished taco shells to complete the circuit. The taco shells are exposed draped over the still depending or vertical pan plates. At the exit end of the machine an operator removes the completed, U-shaped taco shells and puts them in a receptacle 71 for further handling.

The pan conveyor then rounds the end sprockets and returns in the lower run 23 for another cycle. During the return motion of the pan conveyor 13 the rollers 44 and 46, having been free during most of the time that the pan plates advanced through the cooking oil, encounter angled or cam portions 72 and 73 (FIGS. 2 and 6) of the tracks 47 and 48. The rollers are about ninety degrees from the horizontal position they both were in at the loading end. The roller 46 extends upwardly whereas the roller 44 extends downwardly. The rollers encounter the cam portions 72 and 73 simultaneously or nearly so. As the chains 16 and 17 advance the rollers are cammed back to their initial, horizontally aligned position. They then ride against their closely approached tracks 47 and 48 back to the loading location for a repetition of their cycle.

With the foregoing arrangement there is afforded conveying mechanisms which can easily be lifted out of the oil tank so as to be cleaned and inspected. In normal operation the conveyors receive a plurality of tortillas in a limp condition and automatically hold and fold them into a proper U-shape and advance them in a confined situation into the cooking oil. After cooking, they are lifted from the cooking oil in a stiff, U-shape and are released for subsequent use.

What is claimed is:

1. A taco shell fryer comprising an open top tank for cooking oil; a pan conveyor including a pair of transversely spaced chains arranged in closed loops parallel to each other; means for supporting at least a portion of said pan conveyor to travel in a path leading down into, through and up out of said tank; a rod connected at opposite ends to said chains and extending transversely of said path; a pair of complementary pan plates hinged on and extending from opposite sides of said rod on said pan conveyor; a belt conveyor; a flexible link belt suspended transversely in a catenary curve from said belt conveyor; and means for supporting said belt conveyor to lower said belt from a position spaced above said rod and pan plates into a position draped over and at least partially around said rod and said pan plates as said pan conveyor travels in said path.

2. A taco shell fryer as in claim 1 in which each one of said pair of complementary pan plates includes a plurality of transversely spaced upstanding lugs for laterally positioning portions of taco shells thereon.

3. A taco shell fryer as in claim 1 in which said pan conveyor cross rod is round and said pair of complementary pan plates are symmetrically pivoted on said cross rod.

4. A taco shell fryer as in claim 3 including means for pivotally moving said pan plates on said cross rod between a first coplanar position and a second depending mutually parallel position.

5. A taco shell fryer as in claim 4 in which said moving means moves said pan plates simultaneously between said first position in which both pan plates are in substantially the same horizontal plane and said second position in which each pan plate is disposed approximately ninety degrees to said first position.

6. A taco shell fryer comprising a frame, an open top tank supported on said frame, an endless pan conveyor including a pair of parallel chains mounted to travel on said frame and arranged with at least a portion of the upper run of said pan conveyor travelling through a portion of said tank, a horizontally extending rod supported transversely on and between said chains on said pan conveyor, a pair of complementary pan plates, means for mounting said pan plates to pivot symmetrically about the axis of said rod, means for pivoting said pan plates during travel of said pan conveyor, an endless belt conveyor mounted to travel on said frame and arranged with at least a portion of the lower run of said belt conveyor converging toward and diverging from said portion of the upper run of said pan conveyor, and a flexible chain belt section secured to said belt conveyor in position to drape onto and at least partially around said rod and said pan plates in said converging and diverging portions of the upper run of said pan conveyor.

7. A taco shell fryer as in claim 6 in which each of said pan plates is movable on said rod by a crank arm, and tracks on said frame guide said crank arm.

8. A taco shell fryer as in claim 6 in which each of said pan plates has a taco-receiving surface substantially tangent to the surface of said rod.

* * * * *